2,904,539

CYANOACETAMIDOPHTHALIC ACID ESTERS OF POLYMERS

Donald A. Smith and Cornelius C. Unruh, Rochester, N.Y., assignors to Eastman Kodak Company, Rochester, N.Y., a corporation of New Jersey No Drawing. Application December 17, 1956
Serial No. 628,513

13 Claims. (Cl. 260—78.4)

This invention relates to polymeric cyanoacetamidophthalates and their preparation.

In the photographic industry there has been considerable investigation looking to a material which will replace gelatin either in whole or in part as the carrier for silver halide in photographic emulsions. The use of various polymeric materials for this purpose has been suggested such as water-soluble cellulose esters, polyvinyl alcohol, cellulose ether phthalates and synthetic polymers of various types. However, the materials previously suggested for emulsion vehicles usually had only limited utility because they lacked certain properties considered essential in that use. It is desirable that the polymeric material employed for photographic emulsions have complete solubility in aqueous solutions to facilitate coating operations, but after the coating has occurred the vehicle should be susceptible to insolubilizing or hardening so that when exposed the photographic emulsion can be processed in an aqueous processing bath without any danger of the emulsion layer dissolving. The emulsion layer should, however, be capable of swelling in the aqueous processing bath, but only to a limited degree, so that the silver halide therein may be readily contacted by the aqueous processing solutions.

In the case of photographic emulsions made heretofore with polymers containing hydroxyl groups, those polymers which were soluble in water have been difficult to harden to the desired extent under conditions which were satisfactory photographically although various hardening methods have been proposed. Many of the polymers contain an insufficient number of hydroxyl groups to render them soluble in water although water solubility may be induced by introducing carboxyl groups, for example, and improved salt tolerance is imparted thereby. However, the problem of hardening a polymer of that nature remains. By limiting the amount of carboxyl a temperature differentiation solubility can be obtained so that coating therewith may be carried out at a temperature at which the polymer is soluble and the processing may be carried out at a temperature at which the polymer is not dissolved but is swelled. This, however, requires delicate adjustment of temperature conditions as a change in temperature during the processing or washing operations might result in dissolving of the polymer.

One object of our invention is to prepare a polymeric material, useful as the vehicle in silver halide photographic emulsions, which is soluble in water. Another object of our invention is to provide a material of that nature which is susceptible to hardening by formaldehyde or other hardening materials. A further object of our invention is to prepare such a material which is tolerant of salts and which will swell in aqueous solutions. A still further object of our invention is to prepare new synthetic materials by reacting polymers containing hydroxyl groups with cyanoacetamidophthalic anhydrides. Other objects of our invention will appear herein.

We have found that water-soluble hydroxyl containing polymers as well as hydroxyl containing polymers which are not soluble in water can be reacted with a cyanoacetamidophthalic anhydride to give products which are soluble in aqueous solutions and which are capable of being hardened by formaldehyde and by other aldehyde compounds. Such products have good tolerance of salts in their solutions without precipitating. These products are obtained by reacting the hydroxyl containing polymer with 3- or 4-cyanoacetamidophthalic anhydride or a mixture of those isomers. By this reaction a carboxyl group is supplied to the polymer which serves to solubilize the polymer molecule in dilute aqueous alkaline solutions. The polymer by thus being reacted upon becomes very susceptible to hardening by means of aldehydes either of the mono or bis type either at neutral or at an alkaline pH. The extent to which the reaction may be carried out between the hydroxylic polymer and the acetamidophthalic anhydride to obtain these properties may vary within wide limits. To impart hardening properties only a small amount of the cyanoacetamidophthalic group is necessary. If the polymer reacted upon is dispersed in but is not soluble in water, larger degrees of reaction with the cyanoacetamidophthalic anhydride may be necessary to generate sufficient amounts of carboxyl groups in the polymer to impart good water solubility. If desired, the polymer may be reacted with both a second dibasic anhydride and with the cyanoacetamidophthalic anhydride providing there are enough groups supplied by the latter compound to impart hardening properties to the polymeric material.

The preparation of cyanoacetamidophthalic anhydrides is described and claimed in U.S. Patent No. 2,843,605 of Donald A. Smith.

Some of the polymers which may be employed as the starting material in accordance with our invention are as follows: partially esterified lower fatty acid esters of cellulose, partially etherified cellulose, hydroxyethyl cellulose, starch, cellulose, partially esterified or partially etherified starch, alginic acid, polyanhydro glucuronic acid, polyvinyl alcohol, partially esterified polyvinyl alcohol, partially etherified polyvinyl alcohol, the copolymer of vinyl alcohol and ethylene, a polyvinyl acetal such as results from the partial conversion of polyvinyl alcohol with formaldehyde, acetaldehyde or butyraldehyde. The following examples illustrate our invention:

Example 1

To a solution of 10 parts of polyvinyl alcohol and 90 parts of dimethylformamide at 155° C. was added a solution of 1.5 parts of 3-cyanoacetamidophthalic anhydride in 10 parts of dimethylformamide, the addition being accompanied with stirring. Heating and stirring were continued 10 minutes whereupon the product was separated from the mass by precipitation in methanol. The product was washed with methanol and dried. The product which was a polyvinyl cyanoacetamidophthalate weighed 11 grams. Several preparations were made in a like manner using the proportions and precipitant listed in the following table:

| Example No. | Parts pVOH used | Parts anhydride | Precipitant | Yield |
|---|---|---|---|---|
| 2 | 10.0 | 3.8 | MeOH | 12.7 |
| 3 | 25.0 | 25.0 | MeOH | |
| 4 | 5.0 | 50.0 | H₂O | 34.0 |
| 5 | 50.0 | 4.0 | MeOH | |
| 6 | 50.0 | 2.0 | MeOH | 50.0 |
| 7 | 50.0 | 1.0 | MeOH | 50.0 |
| 8 | 50.0 | 4.0 | MeOH | 22.0 |
| 9 | 25.0 | 1.0 | MeOH | |
| 10 | 25.0 | 3.5 | MeOH | |
| 11 | 50.0 | 9.2 | MeOH-ether | 48.5 |
| 12 | 50.0 | 18.4 | MeOH | 55.5 |
| 13 | 50.0 | 27.6 | MeOH | 61.5 |
| 14 | 50.0 | 34.5 | MeOH | 53.2 |
| 15 | 25.0 | 25.0 | Acetone | |
| 16 | 50.0 | 4.0 | MeOH | 53.0 |
| 17 | 50.0 | 4.0 | MeOH-ether | 48.0 |

All of the products prepared in the above examples could be readily insolubilized with alkaline formaldehyde or dialdehydes.

*Example 18*

Five parts of a polymer prepared by deacetylating a copolymer of ethylene and vinylacetate and containing 33 mole percent of ethylene was dissolved in 25 parts of dimethylformamide accompanied by warming. The solution was cooled and there was then added a solution of 1.5 parts of 3-cyanoacetamidophthalic anhydride in 10 parts of dimethylformamide. The solution was heated on an oil bath at 160° C. for 10 minutes and was then poured into a large volume of agitated distilled water. The precipitate was redissolved in methanol-water and again precipitated into distilled water. The reprecipitation was repeated and the polymer was dried at room temperature. An ammoniacal solution of the above polymer containing formaldehyde when coated on a glass plate and dried gave a coating which would swell but would not dissolve in dilute ammonia.

*Example 19*

20 parts of water-soluble cellulose acetate having a 17% acetyl content was dissolved in 50 parts of dimethylformamide by stirring and heating at 150–155° C. There was then added to the hot solution a solution of 10 grams of 3-cyanoacetamidophthalic anhydride in 25 parts of dimethylformamide. The reaction was allowed to proceed for 5 minutes whereupon the product was poured into a large volume of methanol. A white fibrous precipitate formed which was thoroughly washed with methanol and then dried at 60° C. The product had a nitrogen content of 1.1%. A polymer was obtained which was soluble in dilute ammonia but was insolubilized by the addition of a small amount of formaldehyde thereto.

*Example 20*

20 parts of a hydroxyethyl ether of cellulose containing one hydroxyl present per C₆ cellulose unit was dissolved in 200 parts of dimethylformamide by heating and stirring at 160° C. A solution of 10 parts 3-cyanoacetamidophthalic anhydride dissolved in dimethylformamide was added to the stirring hot solution. Upon stirring and heating at 160° C. for five minutes the reaction took place. The resulting mass was filtered through cheesecloth and precipitated into a large volume of agitated methanol. A white fibrous precipitate was obtained which was thoroughly washed with methanol and dried at 50° C. The product had a nitrogen content of 1%. This polymer readily dissolved in dilute ammonia but when formaldehyde was added thereto an irreversible gel was formed indicating insolubilization of the polymer.

*Example 21*

A solution of 30 parts of gelatin and 270 parts of water was warmed to 40° C. and 10% sodium hydroxide solution was added to impart a pH of 9.5. The solution was vigorously stirred and treated with 20 parts of finely powdered 3-cyanoacetamidophthalic anhydride. Small amounts of 10% NaOH were added during this addition to keep the pH within the range of 9–10. The pH continued to drift downward after the addition was completed but for one-half hour was maintained by the addition of alkali at intervals. The product was precipitated in acetone to obtain a soft rubbery mass which was hardened by treatment with methanol.

The following examples illustrate the use of the products in accordance with our invention as vehicles for silver halide in photographic emulsions.

*Example 22*

A silver bromoiodide emulsion was prepared by running a silver nitrate solution into a solution of potassium bromide, potassium iodide, and phthalated gelatin peptizer with agitation by a mechanical stirrer following which a 8.6% solution of hydroxyethyl cellulose modified with 4 mole percent of 3-cyanoacetamidophthalic anhydride based on a C₆ cellulose unit was used as the vehicle in the proportion of 200 grams of the modified polymer per mole of silver. The phthalated gelatin used as the peptizer was prepared in accordance with the teachings of Yutzy and Frame Patent No. 2,614,928.

The emulsion thus prepared was coated onto a cellulose acetate support which had been subbed to cause adhesion of the emulsion layer and dried at 120° F. The subbing layer used was hydroxyethyl cellulose which had been esterified with cyanoacetamidophthalic anhydride. A portion of the emulsion layer was exposed for 1/25 of a second through a step-wedge to light of 3,000° F. color temperature, developed for 10 minutes in conventional developer fixed with a sodium thiosulfate solution and washed in water. The characteristics of the emulsion are given in a subsequent table.

*Example 23*

The procedure of the preceding example was repeated except that there was used for the vehicle a 9% solution of a copolymer if hydrolyzed polyvinyl acetate which has been esterified with cyanoacetamidophthalic anhydride. The copolymer used had a polyvinyl acetate content of 10–12 mole percent and a polyvinyl alcohol content of 86.7 to 88.7 mole percent. The polymer had been esterified with 1.3 mole percent of 3-cyanoacetamidophthalic anhydride. The results obtained are in the table given below.

As a basis of comparison a silver bromoiodide emulsion was prepared in a manner similar to that described in Example 1 except that as the vehicle an 8% gelatin solution was used in the proportion of 200 grams of gelatin per mole of silver. The emulsion was coated on subbed cellulose acetate support, dried, exposed, and processed as described in the previous examples. The sensitometric results obtained from the products of the various examples are as follows:

| | Time of development, min. | Speed CR | γ | Fog |
|---|---|---|---|---|
| Example 22 | 10 | 125 | 1.22 | .07 |
| Example 23 | 10 | 148 | 0.79 | .15 |
| Check | 5 | 128 | 1.82 | .04 |

In many of the types of reactions as described in the application such as where the starting material is a polyvinyl alcohol, polyvinyl acetate or an acetal, it has been found that dimethyl sulfoxide is eminently suitable for use as the solvent in such a procedure. This solvent completely dissolves hydrolyzed polyvinyl acetate at temperatures but very little above room temperature and can be used to conduct reactions at temperatures up to 175° as desired. The following example illustrates the use of this solvent in preparing products in accordance with our invention.

*Example 24*

25 parts of partially hydrolyzed polyvinyl acetate was dissolved in 225 parts of dimethyl sulfoxide and was then reacted with three parts of cyanoacetamidophthalic anhydride at 160°. After 20 minutes at this temperature, the mass was cooled and the product was isolated by precipitation in methanol. The polyvinyl cyanoacetamidophthalate obtained was found to be nicely soluble in water and when in solution therein to be readily insolubilized by the use of an alkaline formaldehyde.

The cyanoacetamidophthalates in accordance with our invention are useful as subbing layers on cellulose ester film base. Of particular interest for this purpose are the polyvinyl esters. The following example illustrates the preparation of a sub-coated cellulose ester base using a polyvinyl cyanoacetamidophthalate.

*Example 25*

A polymer produced by reacting upon a partially hydrolyzed polyvinyl acetate comprising 77 parts of vinyl alcohol and 23 parts of vinyl acetate was esterified with cyanoacetamidophthalic anhydride to produce 1.4 mole percent substitution. The ester thus obtained was dissolved in a mixture of equal parts of methyl alcohol and water to form a solution of 10% concentration. This solution was added to a mixture of acetone, methyl alcohol, methyl cellosolve and water to produce the following composition: 1% polyvinyl cyanoacetamidophthalate, 15% methyl Cellosolve, 15% water, 25% acetone, 44% methyl alcohol. A cellulose ester base was coated by conventional methods with a thin cellulose nitrate subbed layer of the following composition: 2½% nitrate (lowered to medium viscosity) 25% ethylene dichloride, 1¼% butyl alcohol, 71¼% methyl alcohol. The cellulose ester base having the thin cellulose nitrate layer thereon was then overcoated with a layer from the solution described above using a bead or some other method of application. Aqueous coatings of cyanoacetamidophthalated water-soluble partially hydrolyzed polyvinyl acetate were deposited upon this subbing layer and dried at 110° F. When these coatings were immersed in a 1% solution of formaldehyde at a pH of 10.5 and water washed, it was found that their adhesion to the film base was excellent. After drying, the adhesion continued to be excellent. These subbing layers are useful in photographic practice as well as in other instances.

We claim:

1. A method of preparing esters which comprises heating a polymer containing free and esterifiable hydroxyl groups with cyanoacetamido phthalic anhydride for a sufficient time to impart a substantial cyanoacetamido phthalate content to the polymer.

2. A method of preparing esters which comprises heating polyvinyl alcohol with cyanoacetamido phthalic anhydride until a substantial cyanoacetamido phthalate content has been imparted thereto.

3. A method of preparing esters which comprises heating a deacetylated ethylene-vinyl acetate polymer with cyanoacetamido phthalic anhydride until a substantial cyanoacetamido phthalate content has been imparted thereto.

4. A method of preparing esters which comprises heating a lower fatty acid ester of cellulose containing free and esterifiable hydroxyl groups with cyanoacetamidophthalic anhydride until a substantial cyanoacetamidophthalate content has been imparted thereto.

5. A method of preparing esters which comprises heating a cellulose ether containing free and esterifiable hydroxyl groups with cyanoacetamidophthalic anhydride until a substantial cyanoacetamidophthalate content has been imparted thereto.

6. A method of preparing esters which comprises heating gelatin with cyanoacetamidophthalic anhydride until a substantial cyanoacetamidophthalate content has been imparted thereto.

7. A cellulose ester containing lower fatty acid groups and cyanoacetamidophthalic acid groups only one of the carboxyls of each of the cyanoacetamidophthalic acid groups being linked to cellulose.

8. Cellulose acetate cyanoacetamidophthalate only one of the carboxyls of each of the cyanoacetamidophthalyl groups thereof being linked to cellulose.

9. Polyvinyl cyanoacetamidophthalate only one of the carboxyls of each of the cyanoacetamidophthalic groups thereof being linked to vinyl.

10. An alkyl cellulose cyanoacetamidophthalate only one of the carboxyls of each of the cyanoacetamidophthalyl groups thereof being linked to cellulose.

11. Ethyl cellulose cyanoacetamidophthalate only one of the carboxyls of each of the cyanoacetamidophthalyl groups thereof being linked to cellulose.

12. Gelatin cyanoacetamidophthalate only one of the carboxyls of each of the cyanoacetamidophthalate groups thereof being linked to gelatin.

13. The cyanoacetamidophthalate of deacetylated ethylene-vinyl acetate polymer only one of the carboxyls of each of the cyanoacetamidophthalate groups thereof being linked to deacetylated ethylene-vinyl acetate polymer.

No references cited.